United States Patent [19]
Christie et al.

[11] Patent Number: 5,606,553
[45] Date of Patent: Feb. 25, 1997

[54] CELL PROCESSING FOR VOICE TRANSMISSION

[76] Inventors: Joseph M. Christie, 536 Green Ave., San Bruno, Calif. 94066; Albert D. Duree, 16913 Cogan Rd., Independence, Mo. 64055

[21] Appl. No.: 395,745

[22] Filed: Feb. 28, 1995

[51] Int. Cl.⁶ .................................. H04L 12/66
[52] U.S. Cl. .................................. 370/394; 370/395
[58] Field of Search ............. 370/60, 60.1, 61, 370/79, 80, 81, 84, 94.1, 94.2, 105.3, 108

[56] References Cited

U.S. PATENT DOCUMENTS

| | | |
|---|---|---|
| 4,453,247 | 6/1984 | Suzuki et al. . |
| 4,985,889 | 1/1991 | Frankish et al. . |
| 5,163,057 | 11/1992 | Grupp . |
| 5,231,633 | 7/1993 | Hluchyj et al. . |
| 5,239,544 | 8/1993 | Balzano et al. ............... 370/94.2 |
| 5,274,680 | 12/1993 | Sorton et al. . |
| 5,285,441 | 2/1994 | Bansal et al. . |
| 5,311,509 | 5/1994 | Heddes et al. . |
| 5,317,562 | 5/1994 | Nardin et al. . |
| 5,327,421 | 7/1994 | Hiller et al. . |
| 5,357,510 | 10/1994 | Norizuki et al. . |
| 5,365,524 | 11/1994 | Hiller et al. . |
| 5,373,504 | 12/1994 | Tanaka et al. . |
| 5,412,655 | 5/1995 | Yamada et al. ............... 370/94.2 X |

OTHER PUBLICATIONS

"A Technical Report on Speech Packetization" Document T1A1/94–Prepared by T1A1.7, Working Group on Specialized Signal Processing, p. 1–21.

*Primary Examiner*—Melvin Marcelo
*Attorney, Agent, or Firm*—Harley R. Ball; Michael J. Setter

[57] ABSTRACT

The present invention is a method and system which can be applied to supply a constant bit rate link with digital information from a packet or cell based link, such as an Asynchronous Transfer Mode (ATM) link. The present invention automatically provides compensation information to a buffer supplying the constant bit rate link with information. The compensation is not used if packets or cells are made available in the buffer.

17 Claims, 1 Drawing Sheet

CELL PROCESSING FOR VOICE TRANSMISSION

BACKGROUND

1. Field of the Invention

The invention relates to telecommunications, and in particular to the processing of cells containing voice information to account for lost cells.

2. Description of the Prior Art

Transmission based on cell or packet technology is well known. In these systems, a sequence of information to be transmitted is broken into discreet segments called cells or packets (these will be referred to as cells hereinafter, as is known, cells are typically fixed length and packets are typically variable length). Typically, the cell information is referred to as the payload which contains user information bits and is given a header which includes network information bits to aid in identifying, checking, and routing the cell. The cells can then be transmitted across a network independently of other cells in the information sequence. Those skilled in the art are familiar with the advantages of such systems. One of the prominent systems is known as Asynchronous Transfer Mode (ATM). ATM employs a 53 byte cell which includes a 5 byte header and a 48 byte payload.

A major challenge currently facing the industry is the transmission of voice information using ATM cells. Various protocols have been developed for converting voice information into the ATM cell format and then back into a digital voice signal. These protocols are known as ATM Adaption Layers (AALs).

Digital voice information is commonly transmitted on the well known 64 kbit/second DS0 circuit. The DS0 bit stream has interface problems with ATM systems. As the voice cells egress from the ATM network, they are converted and placed on a DS0 circuit. The DS0 circuit requires 64,000 bits of information each second, but each cell only transmits 384 bits (48 bytes) of payload. Multiple cells must arrive and be processed each second to feed the DS0 circuit.

A DS0 circuit requires information from a new cell every 6 milliseconds. The 6 millisecond timing constraint derives from the 4 KHz voice bandwidth which is sampled at the Nyquist rate of 8000 samples/second for digital voice transmission. Each sample requires 8 bits (one byte) in current Pulse Code Modulation (PCM) techniques. As a result, a PCM voice signal produces 8000 bytes per second. Since ATM uses a 48 byte payload, 167 cells per second are required (8000/48=167) to transmit the PCM voice signal. Inverting this number shows that a cell must be processed every 6 milliseconds to transmit voice information from an ATM link to a DS0 link. In other words, Each cell can carry 6 milliseconds of voice information, and a cell must be processed every 6 milliseconds when the full payload is used to avoid gaps in the continuous DS0 voice signal.

Cells are sometimes lost during transmission or arrive at the egress point out of sequence. A problem is how to detect these cells and compensate for them. A delay in cell arrival greater than 6 milliseconds means there is no cell to transfer to the DS0—this is a lost cell condition. Also, mis-sequenced cells may arrive and the problem exists of how to detect and correct the sequence.

Although compensation for lost cells may not be critical for true voice communications due to the small amount of information lost, voice band modems experience significant problems given a 6 millisecond loss of information. The use of voice band modems has increased dramatically in recent years due to the proliferation of Personal Computer (PC) based communications over standard telephone lines.

Various attempts have been made to solve these problems. One solution is based on a sequence number which is placed in the payload of the cell. (ATM cells have no sequence number in the header) The sequence number of the cell can be used at the remote end to detect missing cells, and to provide the proper cell sequence. This system is lacking in that it wastes payload capacity carrying the sequence number. The system also requires additional logic to create and identify the sequence number, and additional buffering to realign the cells. The use of a sequence number also introduces delay because multiple cells must arrive before the sequence numbers can re-aligned.

Another solution is based on a detection window within the cell arrival interval. The cell arrival interval is the amount of time a cell has to arrive before a missing cell condition is created. For a DS0 circuit, cells carrying a 48 bytes of voice information must arrive every 6 milliseconds. The 6 milliseconds is the cell arrival window. If the payload size were to change, i.e from 48 bytes to 32 bytes, the interval would shrink because the DS0 would require cells more frequently.

Within the cell arrival interval, a cell detection window is calculated. Current calculations for the 6 millisecond interval put the cell detection window at 1 millisecond. If a cell arrives during the 1 millisecond detection window, it is assumed to be the correct cell. If no cell arrives during the detection window, a cell is assumed to be lost and compensation is then triggered. If a cell arrives during the interval, but outside of the detection window, the cell is assumed to be mis-sequenced and is discarded.

This system is also lacking in that it requires the calculation of a cell detection window. The window would need to be re-calculated for different cell arrival intervals. The system also requires a separate clock to time the detection window. Additional logic is required to detect if cells arrive in or out of the detection window and to trigger compensation based on this determination.

Lost cell compensation requires providing a replacement cell for the lost cell. The replacement cell is typically a white noise cell. A problem exists with using a white noise cell since an ATM cell only contains 48 bytes, there is not enough information to create a true white noise signal which includes energy spread statistically among multiple frequencies. A 48 byte white noise signal becomes a tone when repeated over and over.

Mis-sequenced cell compensation usually entails re-sequencing the cells through a buffer arrangement. Another technique is to discard mis-sequenced cells.

One system has used a sequence number to place cells in sequential addresses of a buffer. The cells are read out of the buffer in sequence. Silence data is written to each address after the address is read. In that way, cells which do not arrive are automatically replaced with silence data at that address. This system still has deficiencies in that a sequence number is used and additional buffering and logic are required. Additionally, the problem of providing white noise in the restricted cell payload is not addressed.

At present, a system is needed that converts cells containing voice information into a digital voice signal and compensates for lost and mis-sequenced cells with a minimum of logic and processing.

SUMMARY

The present invention provides a system that converts cells containing voice information into a digital voice signal and compensates for lost and mis-sequenced cells with a minimum of logic and processing. The present invention includes a method that supplies information bits received in packet format from a first link to a second link which transmits digital data at a continuous bit rate. The method is used to operate a system comprised of a buffer space that stores groups of information bits from packets that are received from the first link.

The method comprises reading a first group of information bits from the buffer space and supplying the information bits to the second link at the continuous bit rate. The method also includes identifying a time period in which the last bit of the first group is being read from the buffer space and providing a second group of information bits during the time period. The second group is to be read from the buffer space to supply the second link. The method further includes automatically providing compensation bits to be read from the buffer space if a third group of information bits is not available in the buffer space. The method can be applied to compensate for lost cells in an ATM system when providing voice information to a DS0 link from the ATM system.

The present invention also includes a method for supplying information bits received in cell format from a first link to a second link which transmits digital data and voice information at a continuous bit rate. The method comprises receiving cells containing information bits from the first link and writing the information bits to a first buffer. The method includes reading the information bits from the first buffer and writing the information bits to a second buffer on a cell by cell basis, and reading the information bits from the second buffer and supplying the information bits to the second link at the continuous bit rate. The method further includes identifying time periods in which the last bit of each cell is being read from the second buffer and controlling the first buffer to cause it to write to the second buffer during each time period. The method also comprises writing compensation bits to the first buffer after step that buffer is read for the second buffer and before any other information is written to the first buffer.

The present invention also includes a device for supplying information bits received in cell format from a first link to a second link which transmits digital data and voice information at a continuous bit rate. The device comprises a first buffer space operable to store cells containing information bits received from the first link and a second buffer space operable to store cells. The device includes a first control means for reading the information bits from the first buffer space and writing the information bits to a second buffer space within a time period and on a cell by cell basis. The device includes a second control means for reading the information bits from the second buffer space and supplying the information bits to the second link at the continuous bit rate. The device includes a third control means for identifying the time period in which the last bit of each cell is being read from the second buffer space and for causing the first control means to write to the second buffer space during each time period. The device also includes a fourth control means for writing compensation bits to the first buffer space after the first control means has written to the second buffer space and before any other information is written to the first buffer space.

The present invention provides a system for compensating for lost cells when converting digital data from a cell or packet format to a continuous bit rate format. The compensation provides users with an audible sound they are comfortable with during lapses in the voice signal. Additionally, the compensation allows modems to remain on the connection without a reset occurring. The present invention minimizes the amount of buffering and logical processing required to provide this capability.

The present invention provides numerous advantages over prior systems. The present invention does not require the calculation of a cell detection window which would need to be re-calculated for each different cell arrival interval. The present invention does not require a separate clock to time the detection window. The present invention does not require the additional logic required to detect if cells arrive within the detection window and to trigger compensation if the cell does not.

The present invention does not require a sequence number. As such, the present invention does not require a sequential buffer arrangement or the logic required to process the sequence numbers. The elimination of the sequence number also provides more payload capacity to carry user information.

DESCRIPTION

Figure 1:
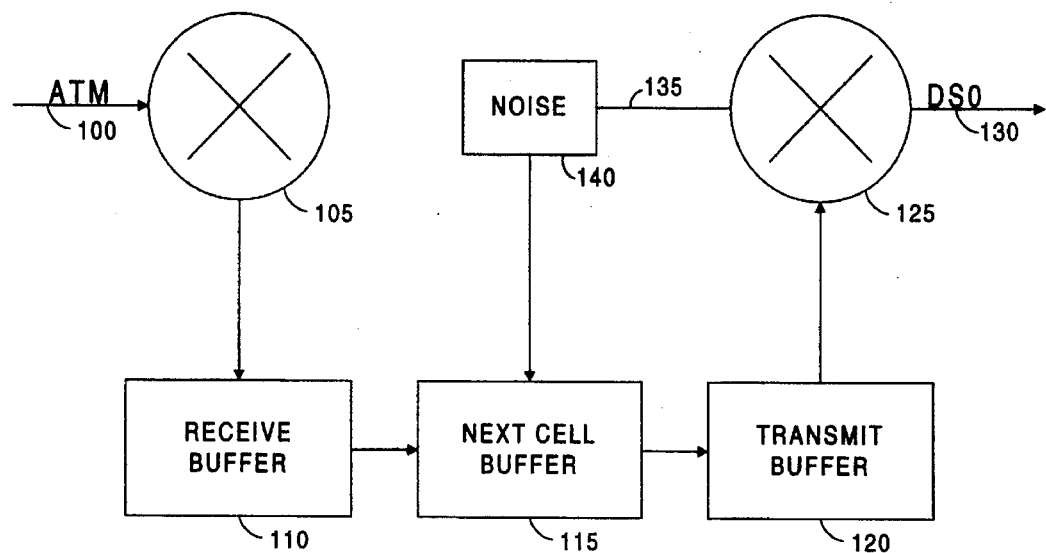
FIG. 1 is a block diagram of a version of the present invention.

FIG. 1 depicts a version of the present invention. Shown in a general sequence from left to right are ATM link 100, matrix clock 105, receive buffer 110, next cell buffer 115, transmit buffer 120, DS0 clock 125, DS0 link 130, control 135, and noise generator 140.

ATM link 100 comprises a standard ATM virtual connection which is well known in the art. ATM link 100 carries cells which contain voice information and are directed to a single DS0 link. Typically, this would be cells from a particular virtual path and virtual channel. Voice information in the context of the present invention also includes data transmitted by modem over a voice connection.

Matrix clock 105 is operable to accept the arriving cells from ATM link 100 and write the cell information to receive buffer 110. Receive buffer is a standard First In/First Out (FIFO) buffer capable of at least storing 48 bytes (53 bytes if the header is processed). If desired, the cell headers can be processed to screen the virtual path identification (VPI) and the virtual channel identification (VCI) contained in the cell headers for the proper cells. Other header processing is known in the art and can be performed as well. Once the desired header processing is complete the header is no longer needed and can be left in the receive buffer and written over. In addition, any overhead bits in the payload could also be disregarded.

Cell payloads are read from receive buffer 110 and written to next cell buffer 115. Next cell buffer 115 is also a standard FIFO buffer capable of storing at least 48 bytes. Cell payloads are read from next cell buffer 115 and written to transmit buffer 120. Transmit buffer 120 is also a standard FIFO buffer capable of storing at least 48 bytes. Cell payloads are read from transmit buffer 120 by DS0 clock 125 which supplies the information bits from the cells to DS0 link 130. One skilled in the art is aware that build out can be provided to DS0 clock 125 as jitter compensation.

The read/write sequence is essentially as follows. As cells arrive from the ATM link, they are written first to receive buffer 110 and then to next cell buffer 115. During this time, transmit buffer 120 is read by DS0 clock 125 at a rate that supports the continuous bit rate of DS0 link 130. During the period in which the last bit of the cell in transmit buffer 120 is being read by DS0 clock 125, two activities occur in sequence. First, the cell in next cell buffer 115 is read and written to transmit buffer 120. Second, a cell payload amount of noise information is written to next cell buffer 115 by noise generator 140.

DS0 link 130 is a standard DS0 link as is known in the art. DS0 clock 125 will read bits from transmit buffer 120 as required to provide a continuous 64 kbit/s DS0 signal to DS0 link 130. For ATM cells carrying 48 bytes of PCM voice information, a cell will be read from the transmit buffer every 6 milliseconds. This means that a byte will be read every 125 microseconds, and a bit will be read every 15.625 microseconds.

During the 15.625 microseconds when the last bit of the cell in the transmit buffer is being read, a cell is read from next cell buffer 115 and written to transmit buffer 120, and a noise cell is written to next cell buffer 115 by noise generator 140. Control 135 indicates that noise generator 140 is capable of writing noise cells to next cell buffer 115 based on the timing of DS0 clock 125 or on the number of bits read by DS0 clock 125. Those skilled in the art will appreciate other techniques which indicate that the last bit of a cell is being read from transmit buffer 120 which would be equally applicable to the present invention.

Noise generator 130 provides an important advantage which distinguishes the present invention over prior systems. Prior systems have suggested compensating for lost cells with white noise or silence data, however, the prior systems have failed to address the problem of simulating white noise in a 48 byte cell payload. White noise is a guassian distribution of energy across multiple frequencies. In order to simulate white noise, a large amount of digital information is required to represent energy distribution over multiple frequencies. A single ATM cell does not have the capacity to carry enough information to simulate white noise.

As discussed, white noise cells can be used to compensate for lost voice cells. If only one cell is lost and replaced with white noise, there is a negligible effect on the voice signal. If multiple cells are lost, white noise indicates to the caller that the line has not gone down. Modems are more sensitive, and even the absence of one cell can cause a modem to reset. A white noise cell provides the modem with enough information to avoid reset.

White noise compensation would typically involve storing a sample of white noise in a buffer and writing this sample to the transmit buffer when a cell is lost. When a 48 byte sample of white noise is stored and used to compensate for lost cells, a problem occurs when multiple cells are lost. The 48 byte sample of white noise must be repeated over and over, and the repetition distributes the same energy pattern over the same few frequencies. The result would not sound like white noise to the callers, but would be an audible tone. The tone might confuse the callers and adversely affect the conversation.

The present invention avoids the repetition of a single white noise cell when multiple cells are lost. Noise generator 130 is operable to provide a random digital white noise signal at a rate fast enough to write 48 bytes of white noise information to next cell buffer 115 every 6 milliseconds. Because the bytes of white noise information are continuously converted from a random signal, a true white noise signal can be provided to DS0 link 130.

Alternatively, multiple bytes of white noise could be stored in a noise buffer. The number of bytes would need to be such that a DS0 signal supplied by a continuous read of the noise buffer would provide a white noise signal to the DS0 link and not a tone. The number of bytes would necessarily be much larger than the 48 bytes in an ATM cell payload. In addition, those skilled in the art will appreciate that other forms of compensation which are equally applicable to the present invention, such as using the last cell transmitted, or using a cell containing a special code.

Figure 2:
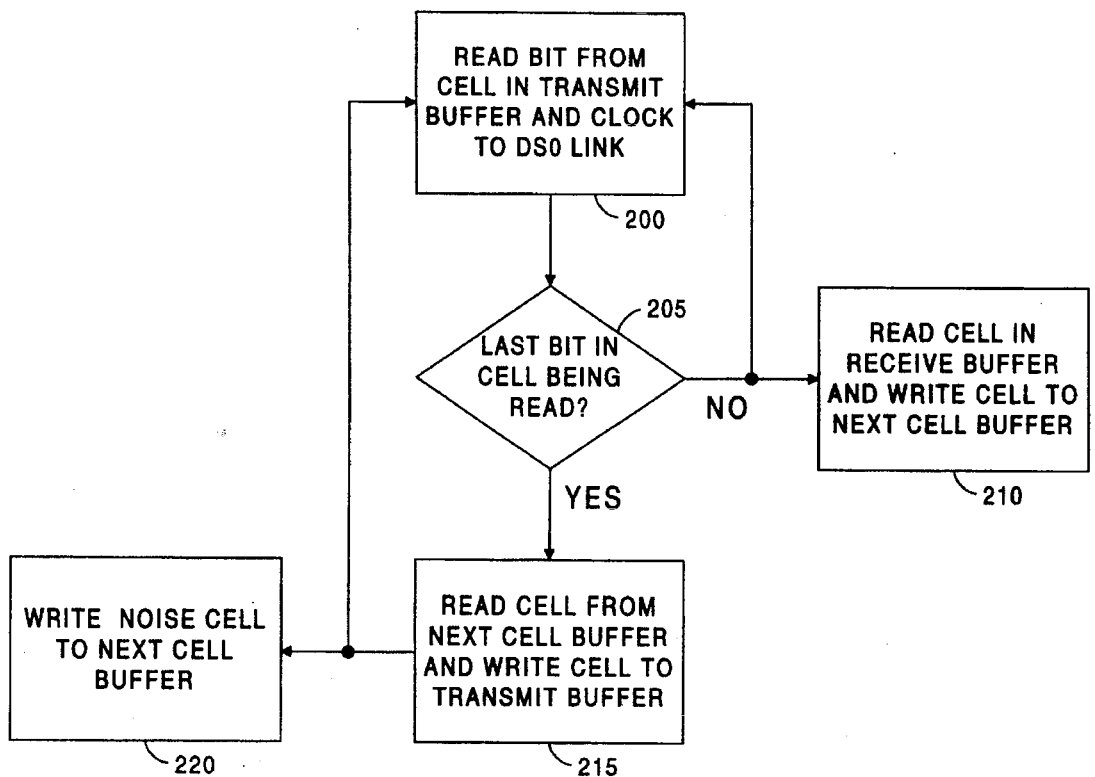
FIG. 2 is a flow diagram of a version of the present invention.

FIG. 2 is a flow diagram depicting the operation of a version of the invention. As discussed above, an ATM link can be used to provide cells containing voice information and data to a DS0 link. To keep the continuous bit rate of the DS0 supplied with information, 48 bytes are read from the transmit buffer and clocked to the DS0 link every 6 milliseconds. This means a byte is read every 125 microseconds, and a bit is read every 15.625 microseconds. Box 200 shows that a bit from the cell in the transmit buffer is read and clocked to the serial bit stream on the DS0 link.

Diamond 205 illustrates the determination if the last bit of the cell in the transmit buffer is being read. This could be accomplished by timing off of the DS0 clock or it may also be accomplished by counting the number of bits read from the transmit buffer. Those skilled in the art will appreciate other methods of accomplishing this function which are equally applicable to the present invention. If the determination is negative (the last bit of the cell in the transmit buffer is not being read), two events occur. Box 210 illustrates that any cells in the receive buffer are read and written to the next cell buffer. Box 205 also leads back to box 200 to restart the cycle.

If the determination in diamond 205 is positive (the last bit of the cell in the transmit buffer is being read), box 215 illustrates that the cell in the next cell buffer is read and written to the transmit buffer. Subsequently to box 215, two events occur. Box 220 indicates that the next cell buffer is written with noise. Box 215 also leads back to box 200 to restart the cycle.

A cycle from box 200 to box 205 and back to box 200 would occur within 15.625 microseconds. A cycle from box 200 to box 205 to box 215 and back to box 200 would also occur in 15.625 microseconds. It is not required that the events of box 210 and box 220 occur within their respective 15.625 microsecond cycles. However, it is preferred that the event of box 220 follow immediately after the event of box 215. The event of box 210 needs to occur before a positive determination is made in box 205 (if a cell is written to the receive buffer during this time).

From the drawing, it can be seen that noise information is automatically written to the next cell buffer. If a cell arrives from the ATM link, it is written over this noise information. If no cell arrives in time, the noise information will be used and will automatically compensate for the loss of the cell. The white noise information should be varied as discussed above each time it is written to the next cell buffer.

The present invention provides a system for compensating for lost cells when converting digital data from a cell or packet format to a continuous bit rate format. The compensation provides users with an audible sound they are comfortable with during lapses in the voice signal. Additionally, the compensation allows modems to remain on the connection without a reset occurring. The present invention minimizes the amount of buffering and logical processing required to provide this capability.

The present invention provides numerous advantages over prior systems. The present invention does not require the calculation of a cell detection window which would need to be re-calculated for each different cell arrival interval. The present invention does not require a separate clock to time the detection window. The present invention does not require the additional logic required to detect if cells arrive within the detection window and to trigger compensation if the cell does not.

The present invention does not require a sequence number. As such, the present invention does not require a sequential buffer arrangement or the logic required to process the sequence numbers. The elimination of the sequence number also provides more payload capacity to carry user information.

Additionally, the present invention provides true white noise when a sequence of cells are lost. The repetition of a single white noise cell would result in a tone. The present invention allows the caller to hear white noise instead of this tone.

Those skilled in the art will appreciate how the present invention can be applied to supply a DS0 link with digital information from an ATM link. Those skilled in the art will also appreciate that the present invention is equally applicable to supply digital links at other bit rates and protocols. The present invention is equally applicable to differing ATM payload sizes and user information content. The present invention is equally applicable to systems other than ATM which provide information in a cell or packet format.

In addition, those skilled in the art are aware of different buffer sizes and arrangements which could support the present invention. A single buffer could be used by partitioning the memory and using pointers to indicate which buffer spaces should be read and written. Pointer processing could thus be used instead of discreet buffers to support the present invention.

In addition, different buffer sizes could be used as well. Smaller buffers could be used for smaller cells or cells partitioned into smaller information components. For example, a 48 byte cell payload of information bits may be transferred through the buffers 5 bytes at a time. Thus, the determination of box 205 in FIG. 2 would be based on the last bit of the five byte group. A cell may also contain 48 bytes for 3 separate DS0 links (16 bytes for each DS0 in each cell). The present invention could be applied to each of the three groups of information going to the three separate DS0 links. In this case, the determination of box 205 in FIG. 2 would occur based on the last bit of the 16 byte group, and occur separately for each of the three groups. As such, the scope of the present invention is not restricted to the specific embodiments listed herein, but is measured only by the following claims.

What is claimed is:

1. A method for operating a system that supplies information bits received in packet format from a first link to a second link which transmits digital data at a continuous bit rate, the system comprising buffer space that stores groups of information bits from packets that are received from the first link, the method comprising:

(a) reading information bits in a first group of information bits from the buffer space and supplying the information bits to the second link at the continuous bit rate;

(b) identifying a time period in which the last bit of the first group is being read from the buffer space;

(c) providing a second group of information bits during the time period, the second group to be read from the buffer space to supply the second link; and (d) automatically providing compensation bits to be read from the buffer space if a third group of information bits is not available in the buffer space.

2. The method of claim 1 wherein the packets received from the first link are Asynchronous Transfer Mode (ATM) cells.

3. The method of claim 2 wherein each group of information bits stored in the buffer space is from an Asynchronous Transfer Mode (ATM) cell payload.

4. The method of claim 1 wherein the packets received from the first link include digital voice information.

5. The method of claim 1 wherein providing compensation bits comprises providing random white noise.

6. The method of claim 1 wherein providing compensation bits comprises providing a code.

7. The method of claim 1 wherein providing compensation bits comprises providing the second group of information bits read from the buffer space.

8. A method for supplying information bits received in cell format from a first link to a second link which transmits digital data and voice information at a continuous bit rate, the method comprising:

(a) receiving cells containing information bits from the first link and writing the information bits to a first buffer;

(b) reading the information bits from the first buffer and writing the information bits to a second buffer on a cell by cell basis;

(d) reading the information bits from the second buffer and supplying the information bits to the second link at the continuous bit rate;

(e) identifying time periods in which the last bit of each cell is being read from the second buffer and controlling the first buffer to cause step (b) to occur during each time period; and (f) writing compensation bits to the first buffer after step (b) and before any other information is written to the first buffer.

9. The method of claim 8 wherein the cells are Asynchronous Transfer Mode (ATM) cells.

10. The method of claim 8 wherein the cells are portions of Asynchronous Transfer Mode (ATM) cell payloads.

11. The method of claim 8 wherein the compensation bits comprise random white noise.

12. The method of claim 8 wherein the compensation bits comprise a code.

13. The method of claim 8 wherein the compensation bits comprise the information bits from the previous cell read from the second buffer.

14. A method for supplying information bits received in cell format from a first link to a second link which transmits digital data and voice information at a continuous bit rate, the method comprising:

(a) receiving cells containing information bits from the first link and writing the information bits to a first buffer;

(b) reading the information bits from the first buffer and writing the information bits to a second buffer on a cell by cell basis if cells are present in the first buffer;

(c) reading the information bits from the second buffer and writing the information bits to a third buffer on a cell by cell basis;

(d) reading the information bits from the third buffer and supplying the information bits to the second link at the continuous bit rate;

(e) identifying time periods in which the last bit of each cell is being read from the third buffer and controlling the second buffer to cause step (c) to occur during each time period; and (f) writing compensation bits to the second buffer after step (c) and before any other information is written to the second buffer.

15. A device for supplying information bits received in cell format from a first link to a second link which transmits digital data and voice information at a continuous bit rate, the device comprising:

(a) a first buffer space operable to store cells containing information bits received from the first link;

(b) a second buffer space operable to store cells;

(c) a first control means for reading the information bits from the first buffer space and writing the information bits to the second buffer space within a time period and on a cell by cell basis;

(d) a second control means for reading the information bits from the second buffer space and supplying the information bits to the second link at the continuous bit rate;

(e) a third control means for identifying the time period in which the last bit of each cell is being read from the second buffer space and for causing the first control means to write to the second buffer space during each time period; and (f) a fourth control means for writing compensation bits to the first buffer space after the first control means has written to the second buffer space and before any other information is written to the first buffer space.

16. The device of claim 15 wherein the second link is a DS0 link.

17. The device of claim 15 wherein the first link is an Asynchronous Transfer Mode (ATM) link.

* * * * *